Aug. 11, 1964 E. J. DIEBOLD 3,144,501

SEAL FOR SEMICONDUCTOR RECTIFIER

Filed Jan. 19, 1961

INVENTOR.
EDWARD J. DIEBOLD

BY
OSTROLENK, FABER, GERB & SOFFEN

ATTORNEYS

United States Patent Office 3,144,501
Patented Aug. 11, 1964

3,144,501

SEAL FOR SEMICONDUCTOR RECTIFIER

Edward J. Diebold, Palos Verdes Estates, Calif., assignor to International Rectifier Corporation, El Segundo, Calif., a corporation of California Filed Jan. 19, 1961, Ser. No. 83,779
5 Claims. (Cl. 174—52)

My invention relates to a novel construction for semiconductor devices such as rectifiers, and more particularly relates to a hermetic seal for semiconductor devices which lends itself to simplified and economical manufacturing techniques.

It is well known that semiconductor devices which utilize the properties of a junction formed in a wafer of silicon or germanium must be sealed from the external atmosphere. At the present time, the cost of the material for forming the seal and the labor required in achieving the seal are major factors in the overall cost of the device.

While seals which contain organic compounds are inexpensive, they are inadvantageous in that they impose temperature limitations on the device. Conversely, those seals which contain ceramics and glasses are inherently expensive and require complex production steps which further add to the expense of the device.

In accordance with the present invention, I provide a novel sealing structure which includes a soft copper stem which receives a flexible conductor at either end wherein the first flexible conductor extends to the external atmosphere, while the second conductor extends internally of the hermetically sealed atmosphere. A barrier at the central portion of the stem completes the hermetic seal on this area. The inner portion of the stem is then secured to a first inverted cup. A steel disk which is concentric with the cup, but is radially spaced therefrom is then secured to the cup by a glassy enamel material which is applied prior to the device assembly in a simplified manner, as will be seen more fully hereinafter. This steel disk is then welded to the semiconductor support body to complete the lower enclosure end of the device.

Devices manufactured in accordance with the invention lend themselves inherently to simplified manufacturing techniques using relatively inexpensive materials, and yet are operable in temperature ranges which vary between minus 65° C. to 200° C. where silicon is used as the semiconductor material. The novel seal will also withstand substantial differential temperature due to high internal temperatures of the device operating in conjunction with strong cooling of the external parts of the device, as by an airblast cooling system. Moreover, the glassy enamel bead which extends from the steel ring to the inverted steel cup described above will serve as a very desirable electrical insulator which will withstand at least 1,000 volts even under conditions including dust contamination, high internal temperatures and water condensation at low temperatures.

Accordingly, a primary object of this invention is to provide a novel seal for semiconductor devices.

Another object of this invention is to provide a novel hermetically sealed semiconductor device which is inexpensive in manufacture and satisfies severe operating conditions.

Another object of this invention is to provide a novel semiconductor device in which a glassy enamel medium which completes the hermetic seal between a steel ring welded to a semiconductor device support and the enclosed end of a double ended copper stem is applied prior to assembly of the unit.

A further object of this invention is to provide a novel hermetically sealed semiconductor device wherein an enamel bead is used in enclosing the hermetic seal around a predetermined peripheral portion of the seal.

A further object of this invention is to provide a novel hermetic seal for semiconductor devices which utilizes an open ended copper stem in combination with an enameled bead.

These and other objects of my invention will become apparent from the following description when taken in connection with the drawings, in which.

Figures 1, 2, 3:
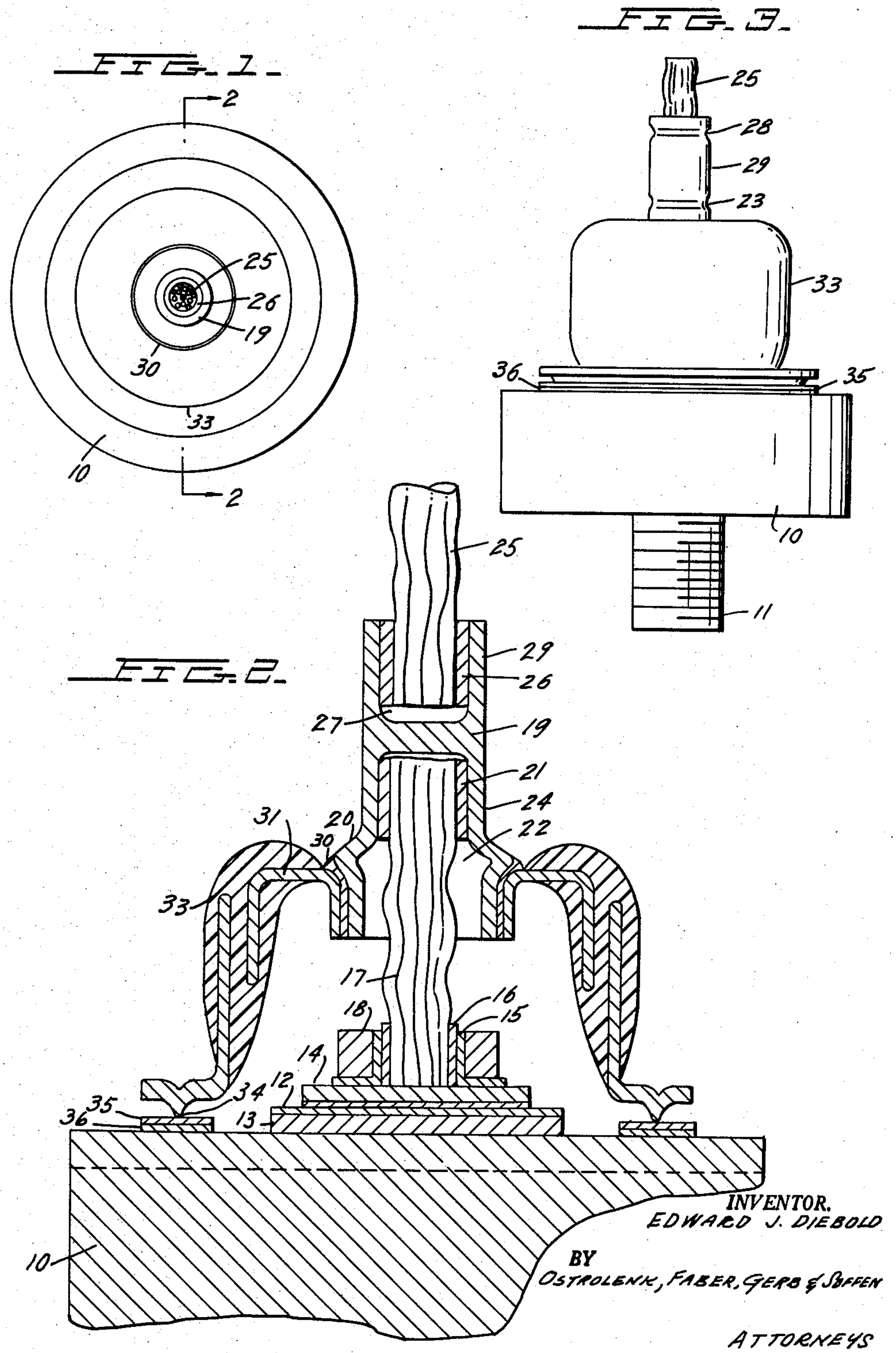
FIGURE 1 shows a top view of a semiconductor device manufactured in accordance with the present invention.
FIGURE 2 is a side cross-sectional view of the device of FIGURE 1 taken across the lines 2—2 in FIGURE 1.
FIGURE 3 is a side view of the device of FIGURE 1.

Referring now to FIGURES 1, 2 and 3, I have shown a semiconductor device which is comprised of a large conductive base 10 which can have a threaded stud 11 extending therefrom, as shown in FIGURE 3.

A semiconductor device of any desired type is secured to the top of base 10, and can, for example, include a thin wafer 12 of semiconductor material such as silicon which has a junction therein, and is soldered at one surface to conductive plate 13, and soldered at its other surface to conductive plate 14, as shown in FIGURE 2. Lower plate 13, which is preferably of a material which has a thermal coefficient of expansion equal or approximately equal to the thermal coefficient of expansion of wafer 12, is then soldered at its lower surface to base 10.

The upper plate 14 then receives a ring 15 having an L-shaped cross-section which contains a copper sleeve 16 therein which is, for example, soldered to flexible lead 17. If desired, a further copper ring 18 may be placed on top of ring 15 to serve as a further heat sink for the wafer 12.

The wafer 12, which can have a single junction therein so as to serve as a rectifier element, is thus seen to be in close thermal contact with a large mass of conductive material so that the device can operate at a relatively low temperature.

It is now essential that the rectifier device be hermetically enclosed in a protective atmosphere so that it will not be affected by the deleterious effects of the external atmosphere. Moreover, it is necessary that this hermetic seal does not excessively add to the expense of the device in either the expense of the elements used for the seal or in the required steps of manufacture to produce this seal.

Furthermore, it is desirable that a rigid connection to the semiconductor device be avoided to avoid imposing straining on the wafer 12, which is relatively fragile and is sensitive to stress.

In accordance with the invention, the hermetic seal is provided by a copper stem 19 which is circular in cross-section, and is open at each end. A lower portion of stem 19 has an outwardly flanged portion 20, as will be described more fully hereinafter.

The upper end of flexible conductor 17 has a copper sleeve 21 secured thereto and fitted into the lower cavity 22 of copper stem 19. As will be seen more fully hereinafter, a crimp 23 (FIGURE 3) is applied at point 24 of FIGURE 2 to secure the lower end of copper stem 19 to conductor 17 through the copper sleeve 21.

The external conductor for the device includes a conductor 25 which has a copper sleeve 26 secured thereto which is placed into the upper cavity 27 of copper stem 19, and again a crimp 28 (FIGURE 3) is applied at point 29 of FIGURE 2 to secure conductor 25 to the stem 19.

From the foregoing, it will be seen that the problem of forming a seal directly around conductor 18 is eliminated, since the conductor 18 terminates within cavity 22. Thus, it is now only necessary to enclose cavity 22 and the lower support 10.

In accordance with the present invention, a soft steel cup 31 is inverted, as shown, and is soldered to the lower portion of flange 20 as by a hard soldering material 30 which could, for example, be silver-lead alloy.

A second soft steel ring 32 which has a diameter larger than the outer diameter of ring 31 is then placed in coaxial and partially concentric relation with respect to ring 31, and the two are secured to one another by a glassy enamel bead 33 to be more fully described hereinafter. The second ring 32 is then provided with an annular welding projection 34, while the base 10 has a steel ring 35 soldered thereto by soldering material 36, the steel ring 35 having a diameter of appropriate dimension to receive welding projection 34 of ring 32.

In operation, welding projection 34 is secured to ring 35 by electric welding as by causing an annular electrode to bear on the top of the outwardly flanged portion of ring 32 which contains projection 34, and by passing a high current from projection 34 through steel ring 35 to the base 10. Note that this welding operation will not damage the semiconductor device within the enclosure because of the flexibility of cable 17.

The novel hermetic seal described above is preferably manufactured by the following process: The body 10 is first prepared and has the semiconductor device assembly secured thereto which is pre-formed. Thereafter, the steel ring 35 is welded to body 10. The stem 19 then has the first inverted soft steel ring 31 soldered thereto by solder 30. Thereafter, the stem 19 and ring 31 are placed in a jig, and held in spaced relation with respect to ring 32. The assembly is then covered by painting or dipping with a slurry of the enamel material.

This subassembly is then heated to an appropriate temperature for an appropriate time as well known to the art so that the slurry melts and forms the enamel bead 33. Depending upon the type of material used, in order to obtain sufficient coverage by the bead 33, it may be desirable to perform the slurry application and heating cycle in several layers, each layer being baked at the proper temperature.

The glassy enamel which then joins members 31 and 32 will form a hermetic seal between these two members, and have a high insulation resistance. In particular, the creepage distance along the external surface will be very long, it being noted that the failure of such insulation beads normally occurs by creepage along contaminated surfaces rather than by a straight puncture through the narrow gap between cup 31 and disk or ring 32.

After this enameling operation, the flexible conductors 17 and 25 are inserted within cavities 22 and 27 respectively, along with their copper sleeves 21 and 26 respectively, and are crimped by external pressures to form the crimps 23 and 28 respectively of FIGURE 3 so that the cables are rigidly electrically and mechanically connected to stem 19. Thereafter, the complete assembly is placed on top of the steel ring 35, and an annular welding electrode is caused to form a weld between disk 32 and ring 35. This weld will, of course, complete the hermetic seal around the semiconductor device which includes wafer 12.

In order that the area enclosed by the seal be completely free of contaminants, it is preferable that the welding operation be carried out in an insert atmosphere.

As pointed out above, this welding operation will not apply stress to the wafer 12 because of the flexibility of cable 25, and furthermore, the heat generated during the welding operation will be dissipated in the relatively large mass of conductive material adjacent the weld, and will not affect wafer 12.

Although I have described preferred embodiments of my novel invention, many variations and modifications will now be obvious to those skilled in the art, and I prefer, therefore, to be limited not by the specific disclosure herein but only by the appended claims.

I claim:

1. A hermetically sealed enclosure for semiconductor devices; said hermetically sealed enclosure including a conductive base member for receiving said semiconductor device, an open ended conductive stem, an annular bead of insulation material and a first and second metallic member embedded in and extending from said annular bead; said first and second metallic members being insulated from one another; said semiconductor device having a conductive lead extending therefrom and being electrically connected to said stem within the said open end of said stem; said first metallic member being secured to said stem along an annular surface; said second metallic member being secured to said conductive base along an annular surface; said first and second metallic members having overlapping ends; substantially all of the external surfaces of said first and second metallic members being encased in said bead of insulation material.

2. The device substantially as set forth in claim 1 wherein said second metallic member is secured to said conductive base by welding.

3. The device substantially as set forth in claim 1 wherein said conductive lead is secured to said stem by crimping.

4. The device substantially as set forth in claim 1 wherein said stem has an opening in its end extending out of the sealed enclosure for receiving an external lead.

5. The device substantially as set forth in claim 3 wherein said conductive lead is flexible.

References Cited in the file of this patent

UNITED STATES PATENTS

| | | |
|---|---|---|
| 2,889,498 | Boyer et al. | June 2, 1959 |
| 2,917,686 | Boyer et al. | Dec. 15, 1959 |
| 2,933,662 | Boyer et al. | Apr. 19, 1960 |

FOREIGN PATENTS

| | | |
|---|---|---|
| 200,461 | Switzerland | Dec. 16, 1938 |
| 1,120,428 | France | July 5, 1956 |